(12) United States Patent
Nomura et al.

(10) Patent No.: US 11,799,863 B2
(45) Date of Patent: Oct. 24, 2023

(54) CREATION DEVICE, CREATION SYSTEM, CREATION METHOD, AND CREATION PROGRAM

(71) Applicant: NIPPON TELEGRAPH AND TELEPHONE CORPORATION, Tokyo (JP)

(72) Inventors: Koki Nomura, Musashino (JP); Yukio Nagafuchi, Musashino (JP); Masaki Tanikawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 749 days.

(21) Appl. No.: 16/967,741

(22) PCT Filed: Mar. 1, 2019

(86) PCT No.: PCT/JP2019/008250
§ 371 (c)(1),
(2) Date: Aug. 6, 2020

(87) PCT Pub. No.: WO2019/168191
PCT Pub. Date: Sep. 6, 2019

(65) Prior Publication Data
US 2020/0374290 A1    Nov. 26, 2020

(30) Foreign Application Priority Data
Mar. 1, 2018  (JP) ................................. 2018-036813

(51) Int. Cl.
*H04L 9/30* (2006.01)
*H04L 9/40* (2022.01)
*G16Y 30/10* (2020.01)
*H04L 41/16* (2022.01)

(52) U.S. Cl.
CPC ............ *H04L 63/101* (2013.01); *G16Y 30/10* (2020.01); *H04L 41/16* (2013.01); *H04L 63/029* (2013.01)

(58) Field of Classification Search
CPC ... H04L 63/101; H04L 63/0227; H04L 41/16; H04L 63/029; G16Y 30/10
See application file for complete search history.

(56) References Cited

FOREIGN PATENT DOCUMENTS

JP    2015198261 A  * 11/2015 ............. H04L 12/24

OTHER PUBLICATIONS

NEC Corp., "Edge gateway", http://jpn.nec.com/iot/platform/egw/index.html, Feb. 2, 2018, 10 pp.

* cited by examiner

*Primary Examiner* — Paul E Callahan
(74) *Attorney, Agent, or Firm* — XSENSUS LLP (57) ABSTRACT

A collection unit (15a) collects information on IoT devices connected to IoT gateways and white lists of the IoT devices, retained by the IoT gateways. An extraction unit (15b) extracts white lists of IoT devices that satisfies a prescribed condition related to the number of the IoT devices of each model or the number of installed locations of the IoT devices of each model from the collected white lists of the IoT devices using the collected information on the IoT devices so as to create a tentative white list. A coupling unit (15c) couples the created tentative white list and the white lists retained by the respective IoT gateways together so as to create a white list applied to the respective IoT gateways.

6 Claims, 10 Drawing Sheets

CREATION DEVICE, CREATION SYSTEM, CREATION METHOD, AND CREATION PROGRAM

CROSS-REFERENCE TO RELATED APPLICATIONS

The present application is based on PCT filing PCT/JP2019/008250, filed Mar. 1, 2019, which claims priority to JP 2018-036813, filed Mar. 1, 2018, the entire contents of each are incorporated herein by reference.

TECHNICAL FIELD

The present invention relates to a creation apparatus, a creation system, a creation method, and a creation program.

BACKGROUND ART

IoT gateways that connect devices such as cameras and temperature and humidity sensors to communication networks as IoT (Internet of Things) devices have been known (see NPL 1). As a security measure for such IoT devices, it is difficult to introduce security software in some cases since the IoT devices have small resources in comparison with personal computers.

Accordingly, as a security measure for IoT devices, white lists in which permitted communication is listed are applied to IoT gateways, and access control to disable the access of communication not seen in the white lists is performed.

CITATION LIST

Non Patent Literature

[NPL 1] "Edge Gateway," [online], NEC, [searched on Feb. 2, 2018], Internet <URL: http://jpn.nec.com/iot/platform/egw/index.html>

SUMMARY OF THE INVENTION

Technical Problem

However, there has been a problem that it takes time so as to create white lists applied to IoT gateways. Generally, machine learning is effective for creating white lists, but it takes about a few days to the create white lists by the machine learning in some cases. Since there is a possibility that IoT devices access hazardous sites during this creation time of white lists by the machine learning, a security measure is also indispensable.

The present invention has been made in view of the above circumstances and has an object of quickly creating white lists applied to IoT gateways.

Means for Solving the Problem

In order to solve the above problem and achieve the object, a creation apparatus according to the present invention includes: a collection unit that collects information on IoT devices connected to IoT gateways and white lists retained by the IoT gateways, the white lists serving to specify communication contents permitted for the respective IoT devices; an extraction unit that extracts white lists of IoT devices that satisfies a prescribed condition related to the number of the IoT devices of each model or the number of installed locations of the IoT devices of each model from the collected white lists of the IoT devices using the collected information on the IoT devices so as to create a tentative white list; and a coupling unit that couples the created tentative white list and white lists retained by the respective IoT gateways together so as to create a white list which it to be applied to the respective IoT gateways.

Effects of the Invention

According to the present invention, white lists to be applied to respective IoT gateways can be quickly created.

DESCRIPTION OF EMBODIMENTS

Hereinafter, an embodiment of the present invention will be illustrated in detail with reference to the drawings. Note that the present invention is not limited to the embodiment. Further, the same portions will be denoted by the same reference signs in the description of the drawings.

[Configuration of Creation System]

Figure 1:
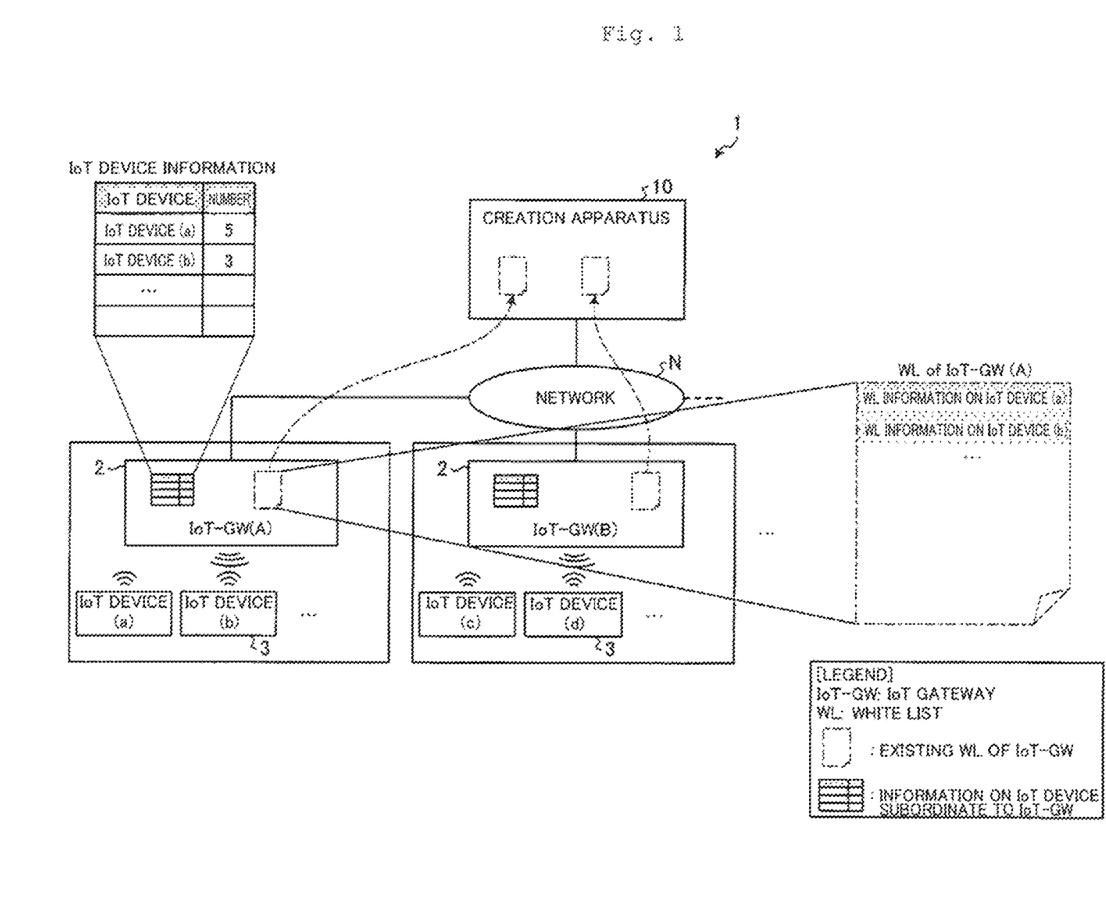
FIG. 1 is a schematic diagram illustrating the schematic configuration of a creation system according to the present embodiment.

FIG. 1 is a schematic diagram illustrating the schematic configuration of a creation system according to the present embodiment. As illustrated in FIG. 1, a creation system 1 has IoT gateways 2 and a creation apparatus 10. IoT devices 3 are, for example, devices such as cameras and sensors not generally connected to a network N but are connected to the IoT gateways 2 via Bluetooth (registered trademark), a wireless LAN (Local Area Network), or the like.

The IoT gateways 2 are network apparatuses that connect the subordinate IoT devices 3 to the network N and realized by a NP (Network Processor), a FPGA (Field Programmable Gate Array), or the like.

The respective IoT gateways 2 periodically collect the information on the IoT devices 3 subordinate to the own apparatuses. For example, as shown in FIG. 1, the respective IoT gateways 2 collect the models of the IoT devices 3 and the numbers of respective models. It is shown in FIG. 1 that five IoT devices (a) and three IoT devices (b) are connected as the subordinates of an IoT-GW(A).

Further, the respective IoT gateways 2 retain white lists. The white lists refer to information that specifies permitted communication contents such as accessible sites for each model of the subordinate IoT devices 3. In the example shown in FIG. 1, the white list of the IoT-GW (A) includes the white list information on the subordinate IoT devices (a) and the white list information on the subordinate IoT devices (b).

The creation apparatus 10 creates the newest white list applied to the respective IoT gateways 2, using white lists actually effectively functioning in all the IoT gateways 2 connected to the network N.

Figure 2:
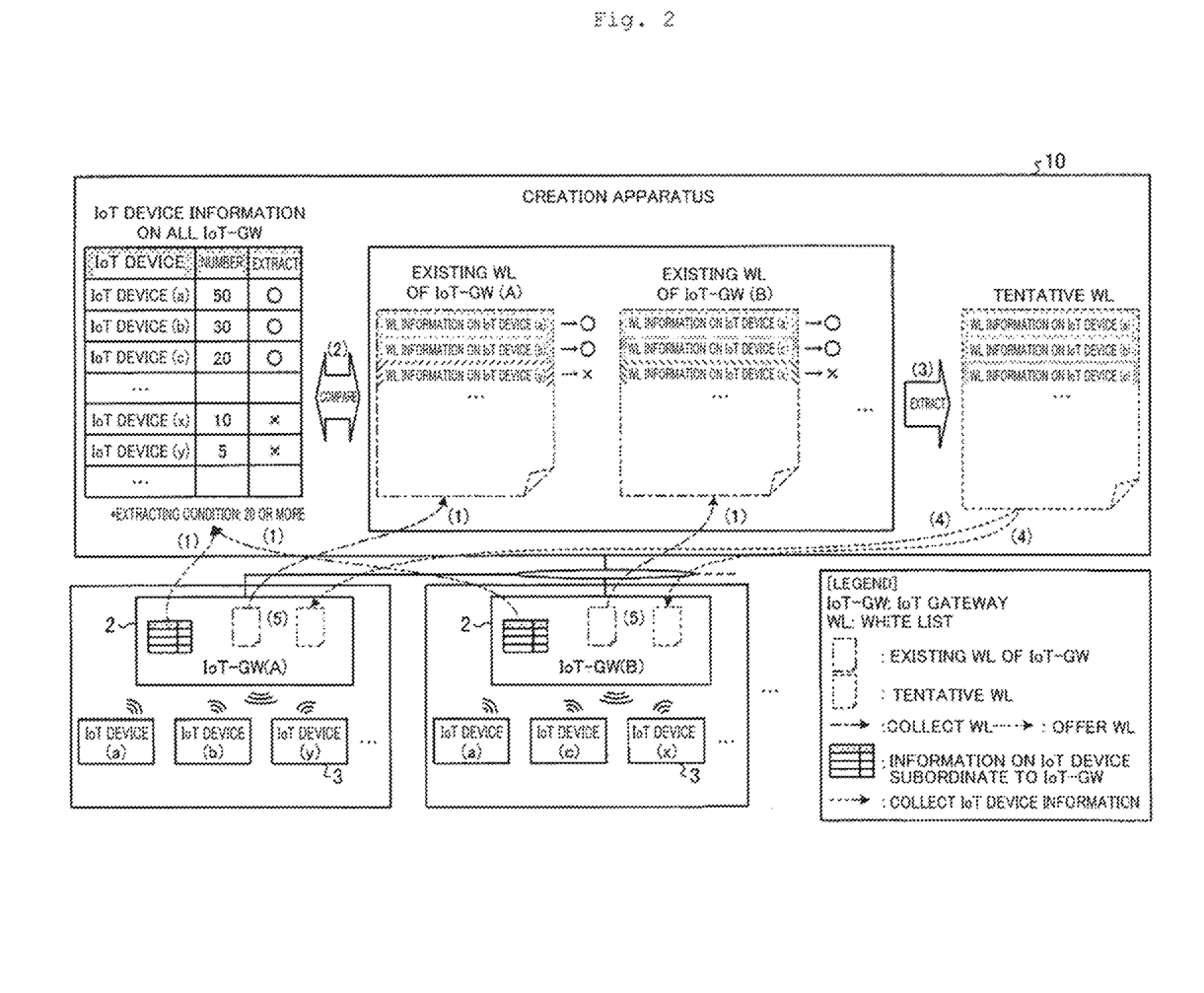
FIG. 2 is a diagram for describing the processing outline of a creating apparatus according to the present embodiment.
Figure 3:
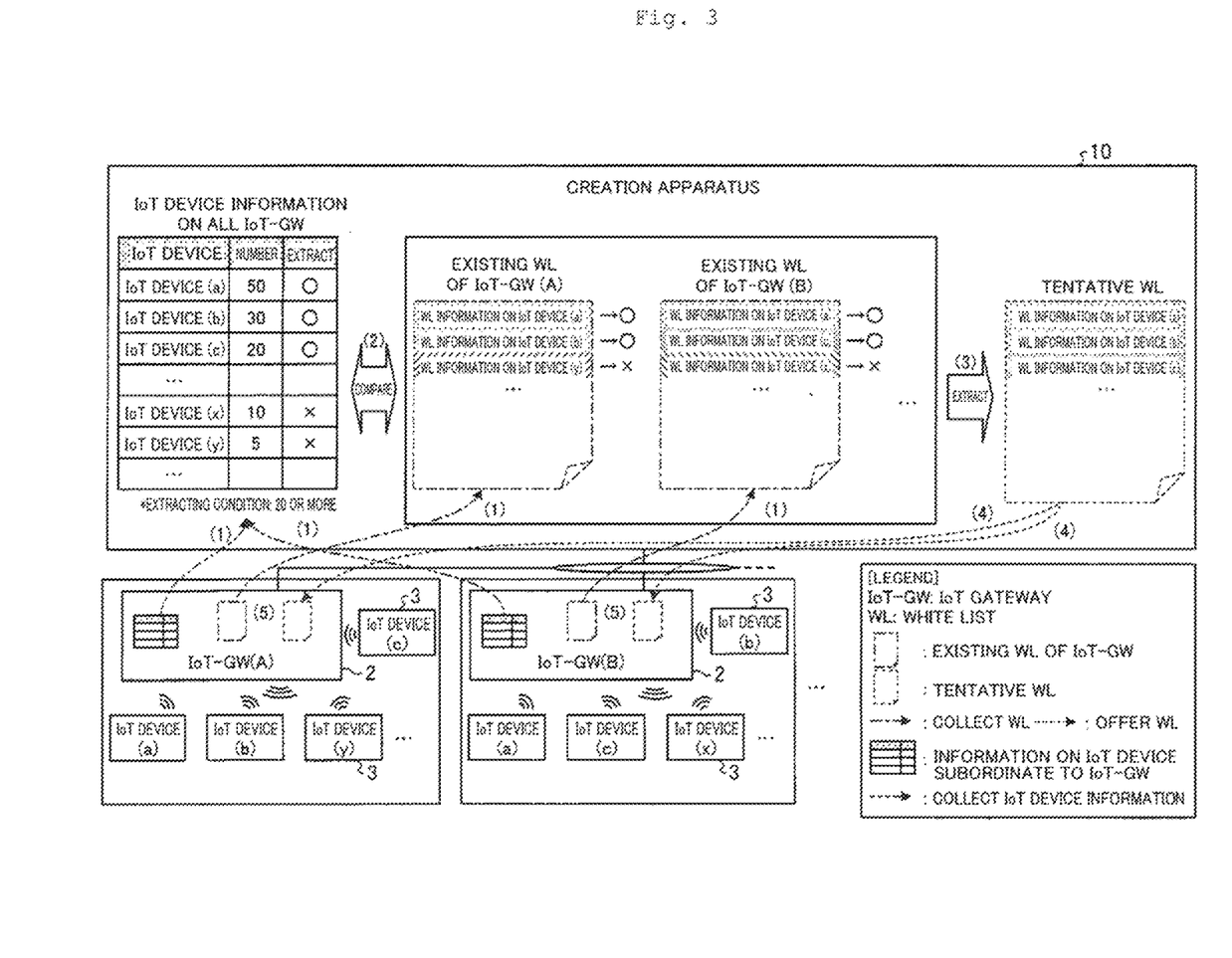
FIG. 3 is a diagram for describing the processing outline of the creating apparatus according to the present embodiment.

Here, FIGS. 2 and 3 are diagrams for describing the processing outline of the creation system 1 according to the present embodiment. As illustrated in FIG. 2, the creation apparatus 10 collects existing white lists retained by the respective IoT gateways 2 and the information on IoT devices subordinate to the respective IoT gateways 2 in the creation system 1 (step (1)).

Then, the creation apparatus 10 extracts the white list information on IoT devices 3 that satisfies a prescribed condition related to the number of the IoT devices 3 of each model, the number of the installed locations of the IoT devices 3 of each model, or the like among the IoT devices 3 connected to all the IoT gateways 2 so as to create a tentative white list (steps (2) and (3)). On this occasion, the creation apparatus 10 compares the white list information with the information on the IoT devices subordinate to the IoT gateways 2 to specify the IoT devices 3 satisfying the prescribed condition. This enables white list information that actually effectively functions in more scenes and has high reliability to be extracted.

In the example shown in FIG. 2, the white list information on the IoT devices 3 of each model, the number of devices of which equals to or more than 20, as a prescribed condition is extracted. Further, in the example shown in FIG. 2, the white list information on the IoT device (a) and the white list information on the IoT device (b) in the existing white list retained by the IoT-GW (A) are extracted and included in the tentative white list. Meanwhile, the white list information on an IoT device (y) retained by the IoT-GW (A) and the white list information on an IoT device (x) retained by the IoT-GW (B) are not extracted and not included in the tentative white list.

Further, the creation apparatus 10 applies a white list reflecting the tentative white list to the respective IoT gateways 2 (steps (4) and (5)). Thus, as illustrated in FIG. 3, the respective IoT gateways 2 enable, even when new IoT devices 3 are connected to the IoT gateways 2, access control using the white list information on the IoT devices 3 concerned included in the white list.

Here, FIG. 3 is different from FIG. 2 in that an IoT device (c) is newly connected to the IoT-GW (A) and an IoT device (b) is newly connected to the IoT-GW (B). In the example shown in FIG. 3, the white list information on the IoT device (c) newly connected to the IoT-GW (A) is not included in the existing white list of the IoT-GW (A) but is included in the tentative white list. Thus, the IoT-GW (A) also enables the access control of the IoT device (c). Further, the white list information on the IoT device (b) newly connected to the IoT-GW (B) is not included in the existing white list of the IoT-GW (B) but is included in the tentative white list. Thus, the IoT-GW (B) also enables the access control of the IoT device (b).

[Configuration of Creation Apparatus]

Figure 4:
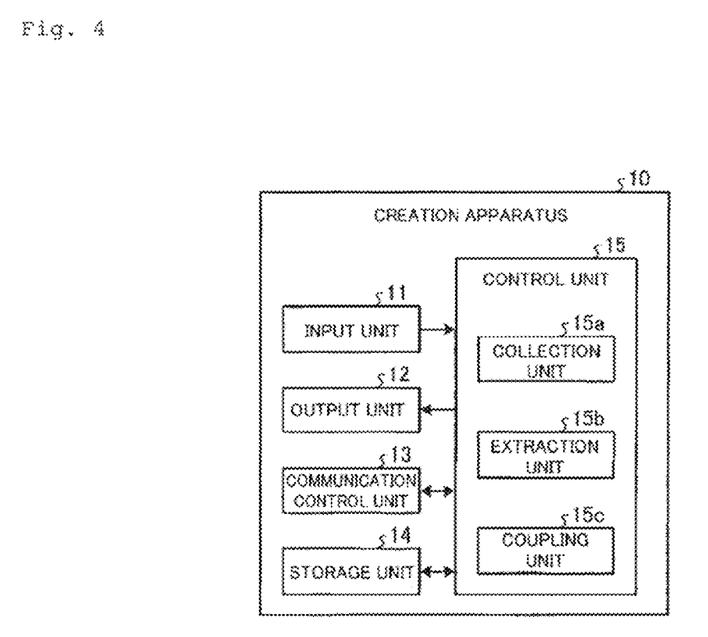
FIG. 4 is a schematic diagram illustrating the schematic configuration of the creation apparatus according to the present embodiment.

FIG. 4 is a schematic diagram illustrating the schematic configuration of the creation apparatus according to the present embodiment. As illustrated in FIG. 4, the creation apparatus 10 is realized by a general-purpose computer such as a personal computer and includes an input unit 11, an output unit 12, a communication control unit 13, a storage unit 14, and a control unit 15.

The input unit 11 is realized by an input device such as a keyboard and a mouse and inputs various instruction information such as a processing start to the control unit 15 in response to an input operation by an operator. The output unit 12 is realized by a display apparatus such as a liquid crystal display, a printing apparatus such as a printer, or the like.

The communication control unit 13 is realized by a NIC (Network Interface Card) or the like and controls the communication between an external apparatus such as a user terminal and the control unit 15 via an electric communication line such as a LAN and the Internet.

The storage unit 14 is realized by a semiconductor memory element such as a RAM (Random Access Memory) and a flash memory or a storage apparatus such as a hard disk and an optical disk. In the storage unit 14, a processing program that operates the creation apparatus 10, data used during the execution of the processing program, or the like is stored in advance or temporarily stored every time processing is performed. Note that the storage unit 14 may be configured to communicate with the control unit 15 via the communication control unit 13.

The control unit 15 is realized by a CPU (Central Processing Unit) or the like and performs a processing program stored in a memory. Thus, as illustrated in FIG. 4, the control unit 15 functions as a collection unit 15a, an extraction unit 15b, and a coupling unit 15c. Note that each of or a part of these function units may be mounted in different hardware. For example, the coupling unit 15c may be mounted in the IoT gateways 2.

The collection unit 15a collects the information on the IoT devices 3 connected to the IoT gateways 2 and white lists retained by the IoT gateways 2 and specifying communication contents permitted for the respective IoT devices 3. Specifically, the collection unit 15a collects IoT device information periodically collected by the respective IoT gateways 2 and existing white lists retained by the respective IoT gateways 2 from all the IoT gateways 2 connected to the network N.

In the example shown in FIG. 2, the collection unit 15a collects IoT device information including the numbers of the respective models of the subordinate IoT devices 3 such as the IoT device (a), the IoT device (b), and the IoT device (y) from the IoT-GW (A). Further, the collection unit 15a collects IoT device information including the numbers of the respective models of the subordinate IoT devices 3 such as the IoT device (a), the IoT device (c), and the IoT device (x) from the IoT-GW (B).

Then, the collection unit 15a consolidates the IoT device information collected from the respective IoT gateways 2. In the examples shown in FIG. 2, 50 subordinate IoT devices (a) exist as the subordinates of all the IoT gateways 2 serving as collecting subjects.

Further, the collection unit 15a collects a white list including the white list information on the IoT device (a), the white list information on the IoT device (b), the white list information on the IoT device (y), or the like from the IoT-GW (A). Further, the collection unit 15a collects a white list including the white list information on the IoT device (a), the white list information on the IoT device (c), the white list information on the IoT device (x), or the like from the IoT-GW (B).

The description of FIG. 4 will be given again. The extraction unit 15b extracts the white lists of IoT devices 3 that satisfies a prescribed condition related to the number of the IoT devices 3 of each model or the number of the installed locations of the IoT devices 3 of each model from the collected white lists of the IoT devices 3 using the collected information on the IoT devices 3 so as to create a tentative white list. The prescribed condition may be a condition related to one of the number of the IoT devices 3 of each model and the number of the installed locations of the IoT devices 3 of each model or a condition related to a combination of the number of the IoT devices 3 of each model and the number of the installed locations of the IoT devices 3 of each model.

Figure 5:
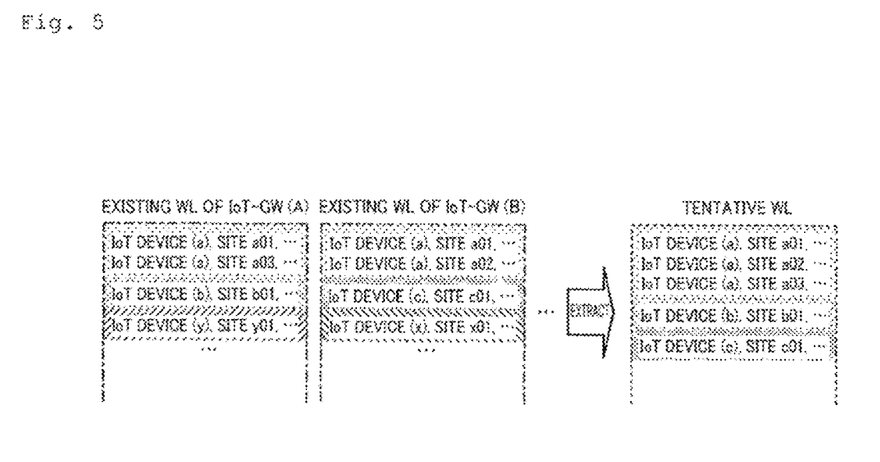
FIG. 5 is a diagram for describing the processing of an extraction unit.

Here, FIG. 5 is a diagram for describing the processing of the extraction unit 15b. In an example shown in FIG. 5, the existing white list of the IoT-GW (A) includes the white list information on the IoT device (a), the white list information on the IoT device (b), the white list information on the IoT device (y), or the like. Further, the white list information on the IoT device (a) includes, for example, white list information indicating that access to a site a01 is permitted and white list information indicating that access to a site a03 is permitted.

Further, the existing white list of the IoT-GW (B) includes the white list information on the IoT device (a), the white list information on the IoT device (c), the white list information on the IoT device (x), or the like. Further, the white list information on the IoT device (a) includes, for example, white list information indicating that access to the site a01 is permitted and white list information indicating that access to a site a02 is permitted.

Further, the extraction unit 15b extracts the white list information on IoT devices 3 each model of which has a prescribed number or more of the IoT devices 3, installed locations, or the like as a prescribed condition so as to create a tentative white list. As illustrated in, for example, FIG. 2, the extraction unit 15b extracts the white list information on IoT devices 3 each model of which has 20 or more of the IoT devices 3 using the collected IoT device information so as to create a tentative white list. In the example shown in FIG. 5, the white list information on the IoT device (a), the IoT device (b), and the IoT device (c) is extracted as a tentative white list.

Note that the prescribed condition refers to a condition for extracting white list information that actually effectively functions in more scenes and has high reliability. If a tentative white list is created so as to cover all the white lists retained by all the IoT gateways 2 serving as processing subjects, there is a possibility that data capacity becomes huge. Accordingly, the creation apparatus 10 extracts only the white list information on IoT devices 3 each model of which has a prescribed number or more of the IoT devices 3, installed locations, or the like so as to create a tentative white list comprehensively covering the white list information.

The white list information on IoT devices 3 each model of which has a small number of the IoT devices 3, installed locations, or the like has low reliability since there is a possibility that invalid contents such as the permission of communication with hazardous sites remain in the white list information. In contrast, the white list information on IoT devices 3 each model of which has a prescribed number or more of the IoT devices 3, installed locations, or the like has high reliability since the white list information actually effectively functions in more scenes. Accordingly, the extraction unit 15b extracts only the white list information on IoT devices 3 each model of which has a prescribed number or more of the IoT devices 3, installed locations, or the like so as to create a tentative white list comprehensively covering the white list information.

The description of FIG. 4 will be given again. The coupling unit 15c couples a created tentative white list and white lists retained by the respective IoT gateways 2 together so as to create a white list applied to the respective IoT gateways 2. That is, the coupling unit 15c couples the existing white lists of the respective IoT gateways 2 and a tentative white list created by the extraction unit 15b together so as to create the newest white list applied to the respective IoT gateways 2.

Figure 6:
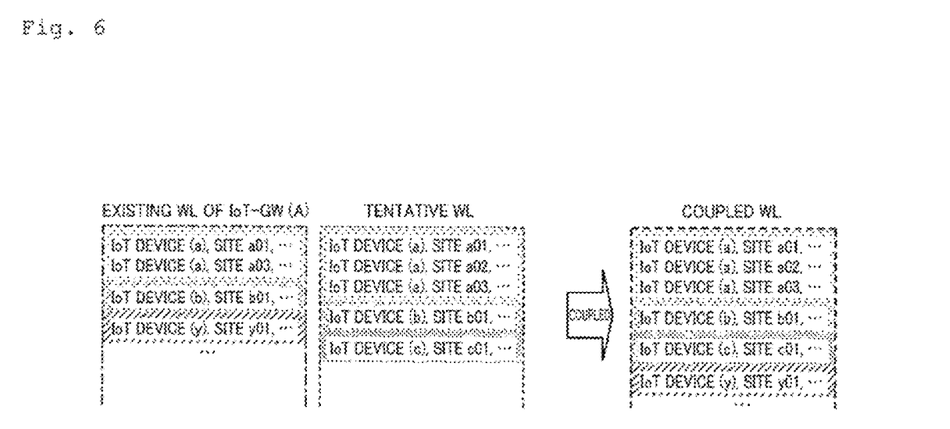
FIG. 6 is a diagram for describing the processing of a coupling unit.

Here, FIG. 6 is a diagram for describing the processing of the coupling unit 15c. In an example shown in FIG. 6, the coupling unit 15c couples the existing white list of the IoT-GW (A) and the tentative white list created by the extraction unit 15b together for the IoT-GW (A) so as to create a white list newly applied to the IoT-GW (A).

Further, on this occasion, white list information indicating that access to a site a02 by the IoT device (a) is permitted and white list information indicating that access to a site c01 by the IoT device (c) is permitted are added from the tentative white list.

As described above, the coupling unit 15c can create the newest white list reflecting white lists actually effectively functioning in all the IoT gateways 2 and apply the created white list to the respective IoT gateways 2.

As a result, for example, when new IoT devices 3 are connected to the IoT gateways 2, the respective IoT gateways 2 enable access control using the white list information on the IoT device 3 concerned included in the newest white list. Further, the respective IoT gateways 2 enable access control using the newest white list information retained by other IoT gateways 2 for IoT devices 3 that have been already connected to the IoT gateways 2 as well.

Note that the coupling unit 15c may be mounted in the IoT gateways 2. In this case, the creation apparatus 10 may only distribute a tentative white list created by the extraction unit 15b to the respective IoT gateways 2 via the communication control unit 13.

[Creation Processing]

Figure 7:
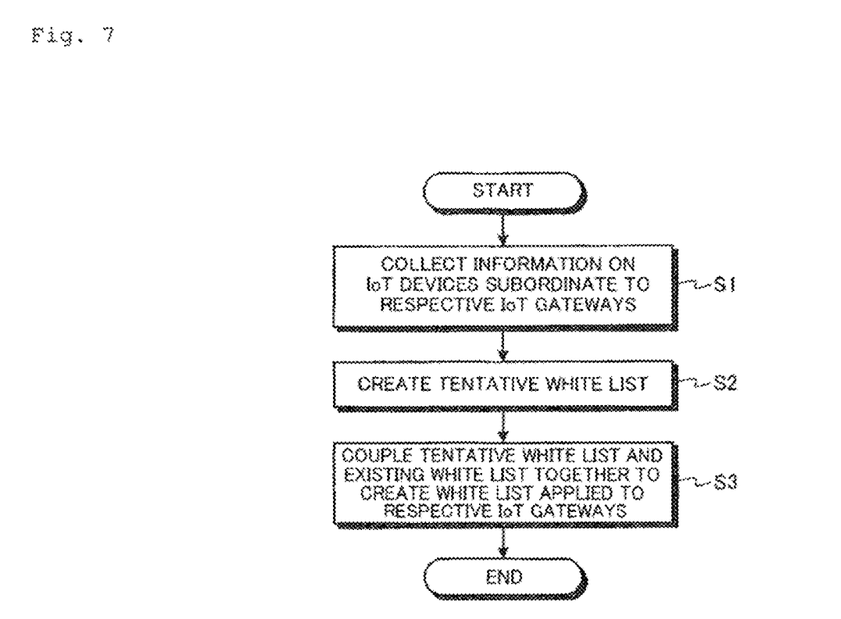
FIG. 7 is a flowchart showing creation processing procedures by the creating apparatus according to the present embodiment.

FIG. 7 is a flowchart showing creation processing procedures by the creation apparatus 10 according to the present invention. The flowchart of FIG. 7 starts at, for example, a timing at which an operation to perform a start is input.

First, the collection unit 15a collects IoT device information periodically collected by the respective IoT gateways 2 and existing white lists retained by the respective IoT gateways 2 from all the IoT gateways 2 connected to the network N (step S1).

Next, the extraction unit 15b extracts the white list information on IoT devices 3 that satisfies a prescribed condition, the white list information actually effectively functioning in many scenes, from the collected white lists of the IoT devices 3 using the collected IoT device information so as to create a tentative white list (step S2).

Here, the prescribed condition refers to a condition for extracting white list information actually effectively functioning in many scenes. For example, the white list information on IoT devices 3 each model of which has a prescribed number or more of the IoT devices 3, installed locations, or the like is extracted.

Then, the coupling unit 15c couples the existing white lists of the respective IoT gateways 2 and the tentative white list created by the extraction unit 15b together so as to create the newest white list applied to the respective IoT gateways 2 (step S3). In this manner, a series of creation processing ends.

As described above, the collection unit 15*a* collects the information on the IoT devices 3 connected to the IoT gateways 2 and the white lists of the IoT devices 3 retained by the IoT gateways 2 in the creation apparatus 10 of the present embodiment. Further, the extraction unit 15*b* extracts the white lists of IoT devices 3 that satisfies a prescribed condition related to the number of the IoT devices 3 of each model or the number of the installed locations of the IoT devices 3 of each model from the collected white lists of the IoT devices 3 using the collected information on the IoT devices 3 so as to create a tentative white list. Further, the coupling unit 15*c* couples the created tentative white list and the white lists retained by the respective IoT gateways 2 together so as to create a white list applied to the respective IoT gateways 2.

In this manner, the coupling unit 15*c* can create the newest white list reflecting white lists actually effectively functioning in all the IoT gateways 2 connected to the network N and apply the created white list to the respective IoT gateways 2. As a result, the creation apparatus 10 can quickly create a white list applied to IoT gateways in a white list creation period based on machine learning as well.

Further, the extraction unit 15*b* extracts the white list information on IoT devices 3 each model of which has a prescribed number or more of the IoT devices 3, installed locations, or the like as a prescribed condition so as to create a tentative white list. As a result, the creation apparatus 10 can create a white list that reflects white lists actually effectively functioning in more scenes and has small capacity.

Example

Figure 8:
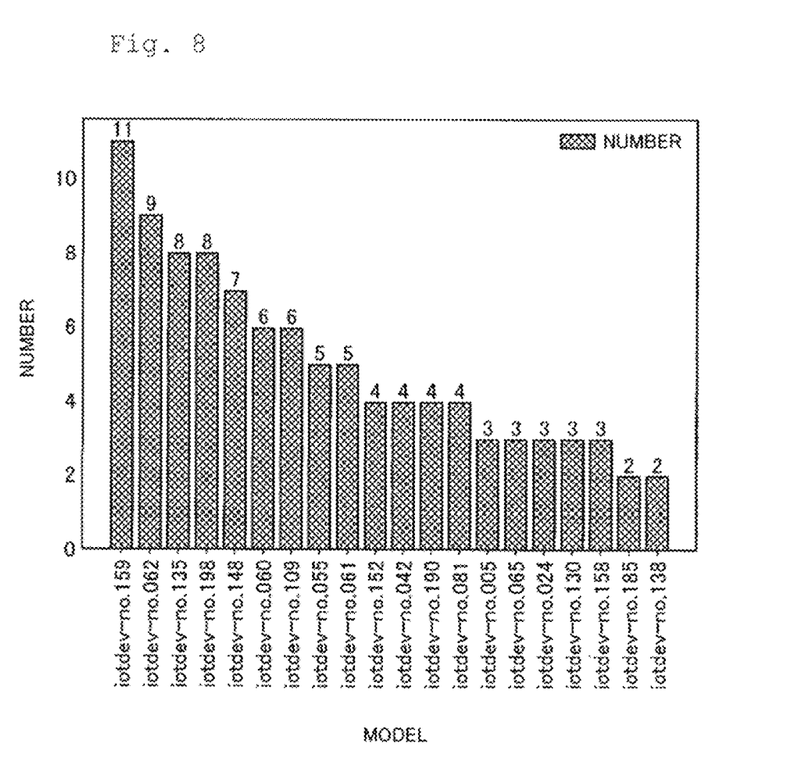
FIG. 8 is a diagram for describing Example.
Figure 9:
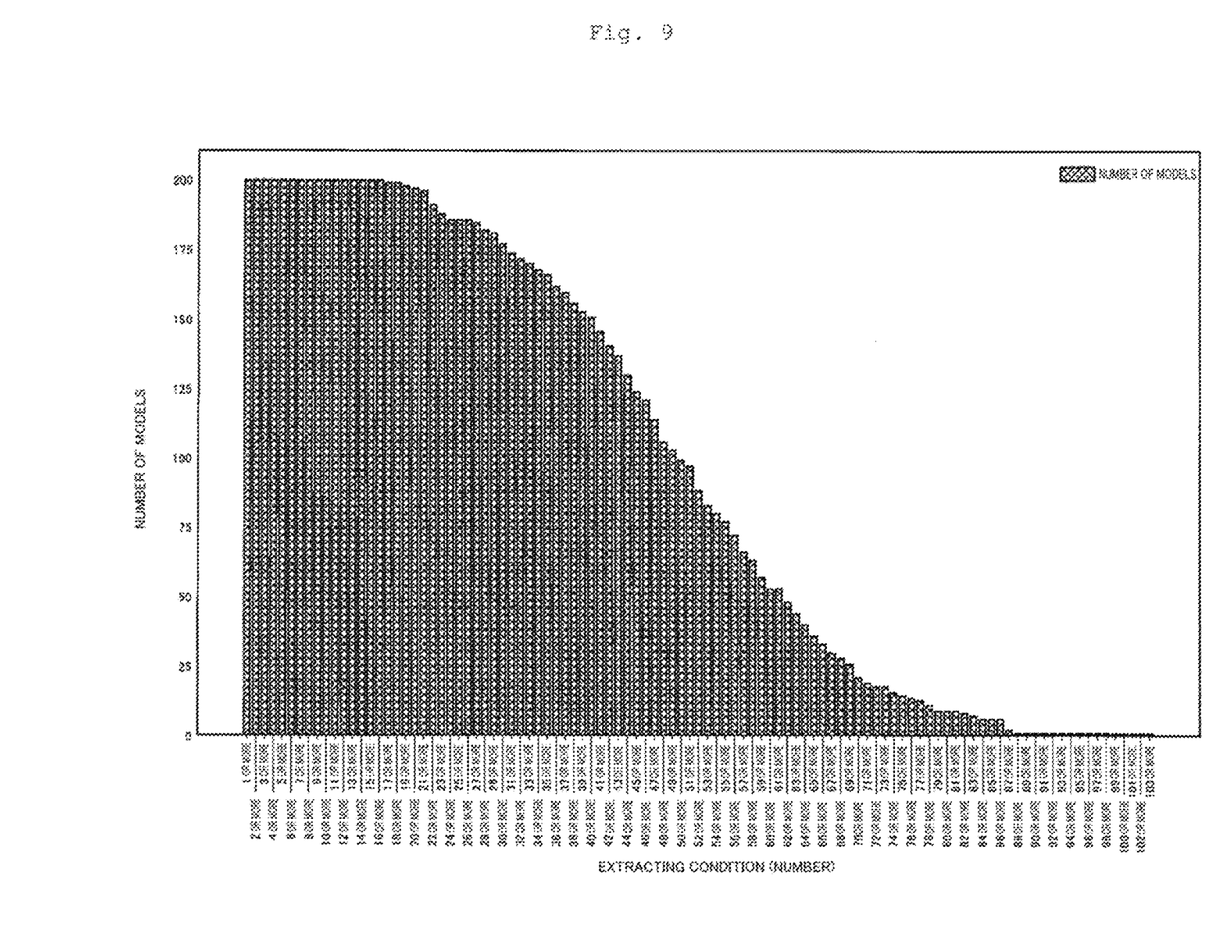
FIG. 9 is a diagram for describing the Example.

In the following Example, an experiment was conducted to select the number of the IoT devices 3 of each model as a prescribed condition in the above embodiment. FIGS. 8 and 9 are diagrams for describing the Example.

In this Example, the total number of (the total number of the models of) the IoT gateways 2 was set at 100 (iotgw-no. 001, iotgw-no. 002, . . . , iotgw-no. 100). Further, the number of the models of the IoT devices 3 was set at 200 (iotdev-no. 001, iotdev-no. 002, . . . , iotdev-no. 200).

Further, the number of the models of the IoT devices 3 connected to the respective IoT gateways 2 as subordinates was set at 20, and the total number of the IoT devices 3 was set at 100. In this case, the numbers of the respective models were assumed as random numbers.

FIG. 8 illustrates a combination of the models and the number of the IoT devices 3 in one IoT gateway 2 (iotgw-no. 001). Here, the total number of the IoT devices 3 subordinate to one IoT gateway 2 is 100, and the total number of the IoT devices 3 subordinate to the respective IoT gateways 2 is 100. Therefore, the total number of the IoT devices 3 subordinate to all the IoT gateways 2 is 10,000.

In this case, the white list information on IoT devices 3 each of which has a prescribed number or more of the IoT devices 3 is extracted from white lists collected from all the IoT gateways 2 on the basis of IoT device information collected from all the IoT gateways 2. The number of the IoT devices 3 as an extracting condition was changed in sequence from one or more IoT devices 3, two or more IoT devices 3, etc., and the number of the models of IoT devices 3 from which white list information is extracted under the respective extracting conditions was confirmed.

FIG. 9 is a diagram showing the relationship between the number of IoT devices as an extracting condition and the number of the models of extracted IoT devices, in which the horizontal axis shows the number of the IoT devices as a condition and the vertical axis shows the number of the models of the extracted IoT devices. As illustrated in FIG. 9, it is found that with an increase in the number of the IoT devices, the number of the models of the IoT devices 3 from which white list information is extracted moderately decreases when the number of the IoT device as an extracting condition is small but gradually rapidly decreases. As described above, the smaller the number of the IoT devices as an extracting condition, the larger the number of the IoT devices 3 from which white list information is extracted becomes and the larger the capacity of a tentative white list becomes.

Further, it is found that the models of the IoT devices 3 from which white list information is extracted are carefully selected when the number of the IoT devices as an extracting condition is set to be large. Here, the white list information on the IoT devices 3 each of which has a small number of IoT devices 3 has low reliability since there is a possibility that invalid contents such as the permission of communication with hazardous sites remain in the white list information. As a result, it is found that the extraction of white list information having high reliability is made possible under careful selection when the number of the IoT devices as an extracting condition is increased. Note that the number of the IoT devices as an optimum extracting condition is desirably selected according to use scenes.

[Program]

A program in which the processing performed by the creation apparatus 10 according to the above embodiment is described in language executable by a computer can be generated. As an embodiment, the creation apparatus 10 can be mounted when a creation program for performing the above creation processing is installed in a desired computer as package software or online software. For example, an information processing apparatus can function as the creation apparatus 10 by performing the above creation program. Here, the information processing apparatus includes a desktop or notebook personal computer. Besides, the information processing apparatus includes a mobile body communication terminal such as a mobile phone and a PHS (Personal Handyphone System) and a slate terminal such as a PDA (Personal Digital Assistants), or the like.

Further, with a terminal apparatus used by a user as a client, the creation apparatus 10 can be mounted as a server apparatus that offers a service related to the above creation processing to the client. For example, the creation apparatus 10 is mounted as a server apparatus that offers a creation processing service to output a white list applied to the respective IoT gateways 2 with the collected information on IoT devices subordinates to the IoT gateways 2 and the white lists of the IoT gateways 2 as inputs. In this case, the creation apparatus 10 may be mounted as a Web server or a cloud that creates a service related to the above creation processing by outsourcing. Hereinafter, an example of a computer that performs a creation program for realizing the same functions as those of the creation apparatus 10 will be described.

Figure 10:
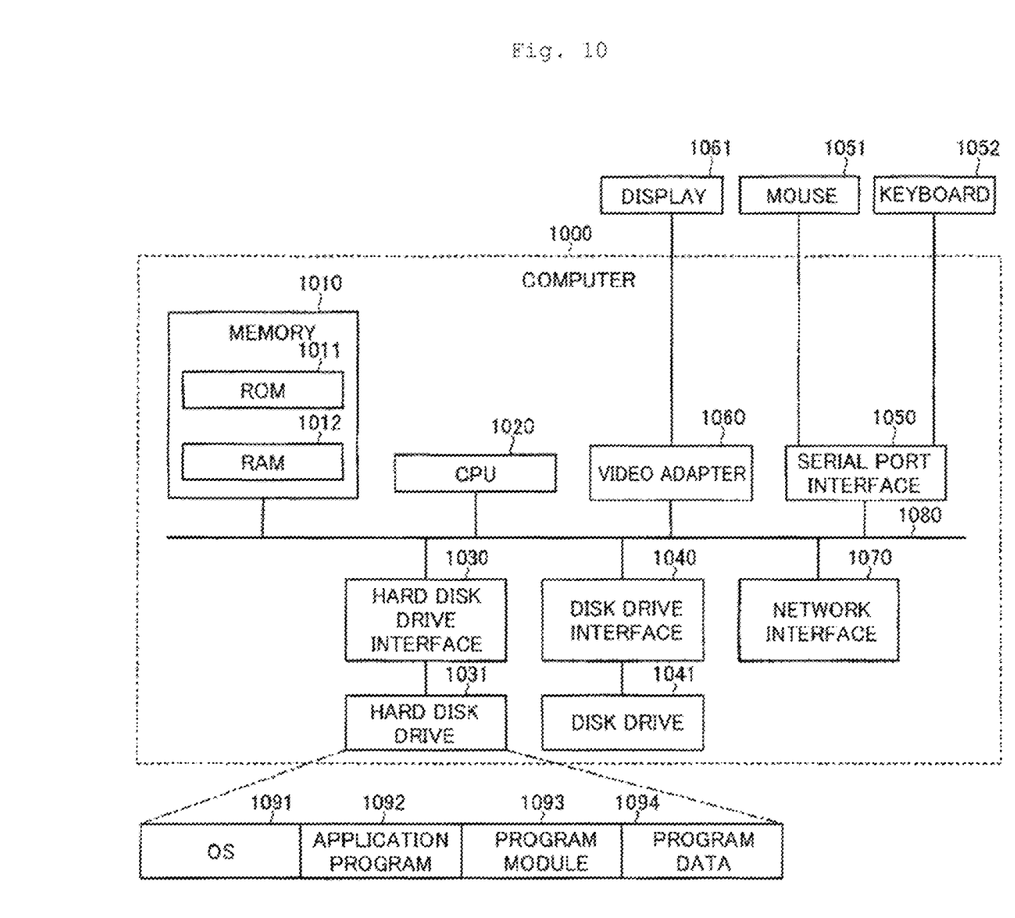
FIG. 10 is a diagram showing an example of a computer that performs a creation program.

FIG. 10 is a diagram showing an example of a computer that performs a creation program. A computer 1000 has, for example, a memory 1010, a CPU 1020, a hard disk drive interface 1030, a disk drive interface 1040, a serial port interface 1050, a video adapter 1060, and a network interface 1070. These respective units are connected to each other via a bus 1080.

The memory 1010 includes a ROM (Read Only Memory) 1011 and a RAM 1012. The ROM 1011 stores, for example, a boot program such as a BIOS (Basic Input Output System). The hard disk drive interface 1030 is connected to the hard disk drive 1031. The disk drive interface 1040 is connected to a disk drive 1041. For example, a detachable storage medium such as a magnetic disk and an optical disk is inserted into the disk drive 1041. For example, a mouse 1051 and a keyboard 1052 are connected to the serial port interface 1050. For example, a display 1061 is connected to the video adapter 1060.

Here, the hard disk drive 1031 stores, for example, an OS 1091, an application program 1092, a program module 1093, and program data 1094. The respective information described in the above embodiment is stored in, for example, the hard disk drive 1031 or the memory 1010.

Further, the creation program is stored in the hard disk drive 1031 as, for example, the program module 1093 in which an instruction performed by the computer 1000 is described. Specifically, the program module 1093 in which the respective processing performed by the creation apparatus 10 described in the above embodiment is stored in the hard disk drive 1031.

Further, data used for information processing based on the creation program is stored in, for example, the hard disk drive 1031 as the program data 1094. Then, the CPU 1020 reads the program module 1093 or the program data 1094 stored in the hard disk drive 1031 into the RAM 1012 where necessary to perform the respective procedures describe above.

Note that the program module 1093 or the program data 1094 according to the creation program may be stored in, for example, a detachable recording medium rather than being stored in the hard disk drive 1031 and read by the CPU 1020 via the disk drive 1041 or the like. Alternatively, the program module 1093 or the program data 1094 according to the creation program may be stored in other computers via a network such as a LAN and a WAN (Wide Area Network) and read by the CPU 1020 via the network interface 1070.

The embodiment to which the present invention made by the present inventor is applied is described above. However, the present invention is not limited to the descriptions and the drawings constituting a part of the disclosure of the present invention according to the present embodiment. That is, other embodiments, examples, operation technologies, or the like made by persons skilled in the art or the like on the basis of the present embodiment are all included in the scope of the present invention.

REFERENCE SIGNS LIST

1 Creation system
2 IoT gateway
3 IoT device
10 Creation apparatus
11 Input unit
12 Output unit
13 Communication control unit
14 Storage unit
15 Control unit
15*a* Collection unit
15*b* Extraction unit
15*c* Coupling unit
N Network

The invention claimed is:

1. A creation apparatus, comprising:
collection circuitry that collects information on IoT devices connected to IoT gateways and white lists retained by the IoT gateways, the white lists serving to specify communication contents permitted for the respective IoT devices;
extraction circuitry that extracts white lists of IoT devices that satisfies a prescribed condition related to the number of the IoT devices of each model or the number of installed locations of IoT devices of each model from the collected white lists of the IoT devices using the collected information on the IoT devices so as to create a tentative white list; and
coupling circuitry that couples the created tentative white list and white lists retained by the respective IoT gateways together so as to create a white list which is to be applied to the respective IoT gateways.

2. The creation apparatus according to claim 1, wherein the extraction circuitry extracts white lists of the IoT devices of each model for which the number of devices of the model equals to or more than a prescribed number as the prescribed condition so as to create the tentative white list.

3. The creation apparatus according to claim 1, wherein the extraction circuitry extracts white lists of the IoT devices of each model for which the number of installed locations of devices of the model equals to or more than a prescribed number as the prescribed condition so as to create the tentative white list.

4. A creation system comprising:
a creation apparatus; and
IoT gateways,
wherein the creation apparatus includes:
collection circuitry that collects information on IoT devices connected to the IoT gateways and white lists retained by the IoT gateways, the white lists serving to specify communication contents permitted for the respective IoT devices; and
extraction circuitry that extracts white lists of IoT devices that satisfies a prescribed condition related to the number of the IoT devices of each model or the number of installed locations of the IoT devices of each model from the collected white lists of the IoT devices using the collected information on the IoT devices so as to create a tentative white list,
wherein the IoT gateways include a coupling circuitry that couples the created tentative white list and white lists retained by the own apparatuses together so as to create a white list which it to be applied to the own apparatuses.

5. A creation method, comprising:
collecting information on IoT devices connected to IoT gateways and white lists retained by the IoT gateways and specifying communication contents permitted for the respective IoT devices;
extracting white lists of IoT devices that satisfies a prescribed condition related to the number of the IoT devices or the number of installed locations of the IoT devices for each model of the IoT devices from the collected white lists of the IoT devices using the collected information on the IoT devices so as to create a tentative white list; and
coupling the created tentative white list and the white lists retained by the respective IoT gateways together so as to create a white list applied to the respective IoT gateways.

6. A non-transitory computer readable medium including computer instructions which when executed for causing a computer to perform:

collecting information on IoT devices connected to IoT gateways and white lists retained by the IoT gateways, the white lists serving to specify communication contents permitted for the respective IoT devices;

extracting white lists of IoT devices that satisfies a prescribed condition related to the number of the IoT devices of each model or the number of installed locations of IoT devices of each model from the collected white lists of the IoT devices using the collected information on the IoT devices so as to create a tentative white list; and coupling the created tentative white list and the white lists retained by the respective IoT gateways together so as to create a white list applied to the respective IoT gateways.

* * * * *